United States Patent
Parker et al.

(10) Patent No.: US 6,789,903 B2
(45) Date of Patent: Sep. 14, 2004

(54) GENERATING AN INHIBIT SIGNAL BY PATTERN DISPLACEMENT

(75) Inventors: Joseph Parker, Camarillo, CA (US); Paul Vlahos, Tarzana, CA (US); Arpag Dadourian, Northridge, CA (US); Arie Berman, Chatsworth, CA (US)

(73) Assignee: Imatte, Inc., Chatsworth, CA (US)

( * ) Notice: Subject to any disclaimer, the term of this patent is extended or adjusted under 35 U.S.C. 154(b) by 0 days.

(21) Appl. No.: 10/370,356

(22) Filed: Feb. 18, 2003

(65) Prior Publication Data

US 2004/0160581 A1 Aug. 19, 2004

(51) Int. Cl.[7] .......................... G03B 21/14; G03B 21/26
(52) U.S. Cl. ............................ 353/28; 353/97; 353/122
(58) Field of Search ........................... 353/122, 28, 97; 348/586, 590, 607; 382/173

(56) References Cited

U.S. PATENT DOCUMENTS 6,361,173 B1 * 3/2002 Vlahos et al. .............. 353/122
6,392,694 B1 * 5/2002 Bianchi ...................... 348/169
6,417,853 B1 * 7/2002 Squires et al. .............. 345/473
6,598,979 B2 * 7/2003 Yoneno ...................... 353/122
6,641,269 B2 * 11/2003 Kitazawa .................... 353/122

* cited by examiner

Primary Examiner—Christopher E Mahoney
(74) Attorney, Agent, or Firm—Blakely Sokoloff Taylor & Zafman (57) ABSTRACT

A pattern is projected onto a screen by a projector using an illumination having a non-visible wavelength. A camera, displaced several inches from the projector, observes the projected pattern whose signals are then stored to create a reference frame. The pattern is then projected onto the screen a second time with a presenter present. The camera observes the projected pattern whose signals are then stored to create a current frame, including the presenter, and signals obtained from the reference frame are compared to determine their difference. In unobscured screen areas, the pattern images match. The pattern on the presenter is displaced because of the displaced camera, and no longer matches the reference pattern, thereby identifying the presenter's silhouette area.

16 Claims, 7 Drawing Sheets

GENERATING AN INHIBIT SIGNAL BY PATTERN DISPLACEMENT

BACKGROUND OF THE INVENTION

That portion of an image being projected onto a presenter in front of a projection screen is distorted and very distracting to both an audience and a presenter. U.S. Pat. No. 6,361,173 describes a method for generating a matte (alpha) signal to selectively inhibit the projected image in the screen area occupied by a presenter. A presenter may then walk in front of the screen and look at his audience without being blinded by the projector.

The screen and presenter are illuminated with infrared light, and observed with an infrared camera. The pixel levels of a stored infrared screen-image when subtracted from the camera image of the screen with presenter present are zero in the unobscured screen area. All other pixels should be in the silhouette area of the presenter. Several other methods are described for locating the position of the presenter.

The increased infrared illumination from opening a door or adjusting room illumination can result in a failure to generate a useable matte; also a portion of the presenter, or his wardrobe, matching the screen's infrared reflection can destroy a portion of the matte.

OBJECTIVE OF THIS INVENTION

To develop a reliable binary selective inhibit signal accurately identifying those pixels comprising the presenter's silhouette; where said signal is immune to a subject's infrared reflection levels and immune to randomly occurring non-uniform infrared flooding of the projection screen and presenter.

BRIEF DESCRIPTION OF THE INVENTION

A pattern is projected onto a screen by an infrared projector. An infrared camera, displaced several inches from said projector, observes the projected pattern whose signals are then stored to create a reference frame. Infrared signals from a current frame, including a presenter, and signals obtained from said reference frame, are compared to determine their difference. In unobscured screen areas, the pattern images match. The infrared pattern on the presenter is displaced because of the displaced camera, and no longer matches the reference pattern, thereby identifying the presenter's silhouette area.

DETAILED DESCRIPTION OF THE INVENTION

Four key elements make a stable Inhibit Signal possible. They are: 1) the use of a projected pattern upon the screen and presenter using non-visible infrared, 2) the lateral displacement of an infrared camera whose image of the pattern will be displaced for any subject not in the plane of the screen, 3) a unique pattern, such as a random noise pattern, whose displaced image will no longer match the original image, thus making a presenter's infrared reflectance irrelevant, and 4) the comparison of differentiated pattern signals, thus providing immunity to infrared spill on the projection screen.

Figure 1:
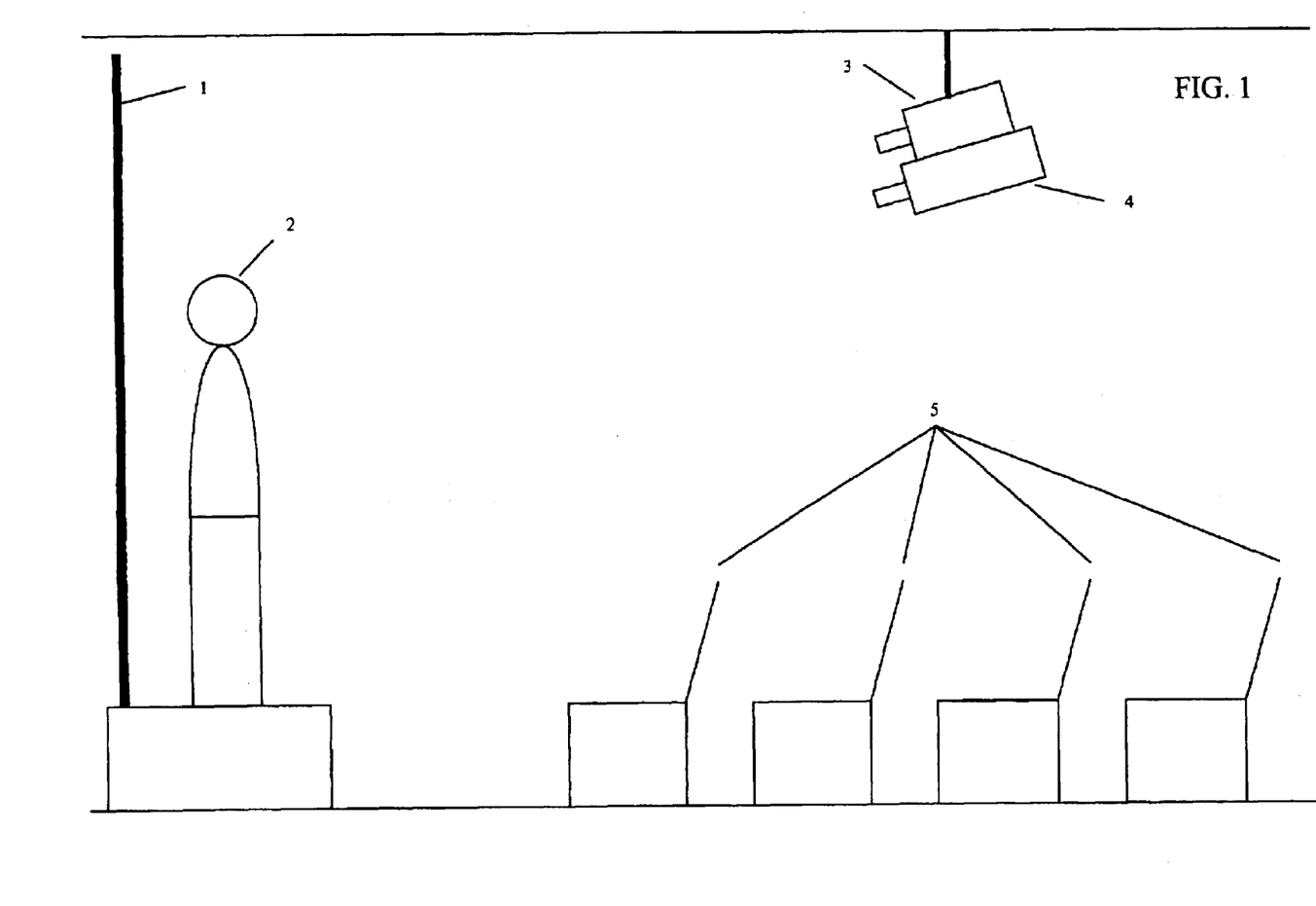
FIG. 1 illustrates the placement of a projection screen, a presenter, an infrared camera and project, and a video projector, with respect to an audience area.

FIG. 1 is a side view of an auditorium or meeting room. A presenter 2 is shown standing before screen 1. An infrared camera and projector in housing 4 are located just below a video projector 3, typically set well above audience 5. Audience 5 will see a projected data image on the screen but not on the presenter. Data images are those images accompanying a presentation and are projected by a video projector.

Figure 2:
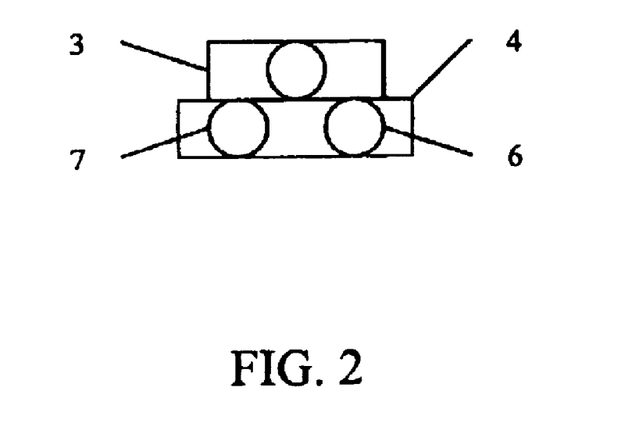
FIG. 2 is a view from the presenter's position, showing the placement of the infrared projector and camera, with respect to a video projector.

FIG. 2 is a view from the stage looking toward a video image projector 3, and a housing 4 that contains an infrared projector 6 and an infrared camera 7, including their associated electronics. While camera 7 is shown laterally displaced to the left of projector 6, it may be displaced in any direction from projector 6, except axially. Infrared camera 7 and projector 6 are shown as located just below video projector 3, although other positions are acceptable.

Projector 6 projects a pattern onto the projection screen using infrared light. Camera 7, displaced several inches from projector 6, observes this infrared pattern and stores its image as a reference frame in memory 10 of FIG. 3. All subsequent image frames, usually including a presenter, are routed to memory 15 and are identified as current frames. Each succeeding current frame replaces the previous current frame in memory 15, at a video rate.

Figure 3:
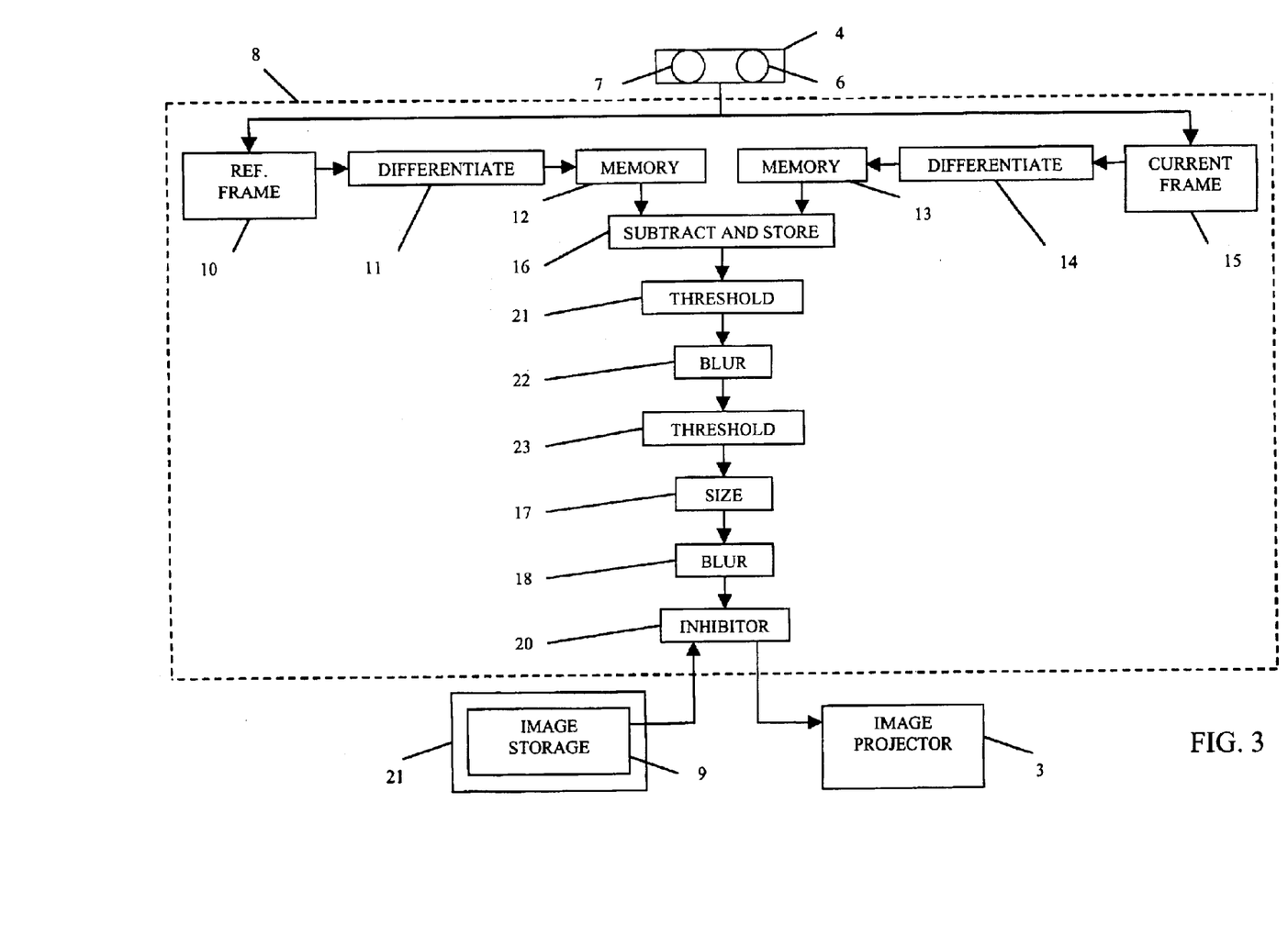
FIG. 3 is a block diagram showing selected signal processing steps which can be employed in generating a stable matte signal.

The pattern in current frame memory 15, in the absence of a subject, will match the pattern in the stored reference frame memory 10. In a current frame that includes a presenter, pixels on the screen outside the presenter's silhouette area will continue to match.

The presenter, not being in the plane of the screen, and because of the displaced camera, will displace the pattern from its original position. This displaced pattern causes a large number of pixels in the presenter's silhouette area to fail to match corresponding pixels in the reference frame pattern, and their difference will be significantly greater than system noise.

Comparing the reference frame pattern signals with a current frame pattern signals at corresponding pixels permits determination of a measure of their difference. One such measure is their absolute arithmetic difference (i.e. their divergence from each other); a second measure is the absolute difference of their differentials. The arithmetic difference is useful in generating a matte signal when the presentation room environment can be controlled. The difference of differentials is essential when the room environment cannot be controlled.

Comparing the differentials of the reference frame and current frame signals, rather than comparing the original signals, achieves immunity to randomly occurring infrared spill onto the projection screen, especially when the spill is a streak of light across the screen from an opened door. The difference in signal level between two adjacent pixels (a differential) is the same whether this difference occurs at low or high levels of spill light Differentiation of reference frame signals in memory 10 can be accomplished in differentiator 11 for each pixel by subtracting the signal level of a first pixel from the signal level of the following pixel. Their difference replaces the signal level of the first pixel. The difference between the signal levels of a second and third pixel establishes a value for the second pixel. This procedure of subtracting adjacent pixels is continued to the end of each scan line, and is applied to all pixels in the reference frame. Vertical and other derivatives can also be computed in addition to, or in place of, the horizontal differentiation described above. These reference frame differentials are stored in memory 12. Since the differentials of the reference frame are immune to spill light, and do not change during a presentation, their computation is done only once.

By the same process, pixel signals in each current frame 15 are differentiated in differentiator 14 and stored in memory 13. When the differentiated signal in memory 12 of a pixel in the reference frame is subtracted from the differentiated signal in memory 13 of a pixel in the current frame, and their absolute difference is above the noise level, that pixel is in the area of the presenter's silhouette.

Any subject, not in the plane of the screen will displace the camera view of the projected pattern because of the displacement of the camera, and the displaced pattern signals and reference frame pattern signals will no longer match, nor will their differentials.

A selected measure of difference, such as the absolute arithmetic difference, between the signals or preferably, their derivatives computed by subtract and store 16 is then compared to a threshold (21), set near zero, but above camera and system noise, and assigns a binary matte signal level of 1.0 for all pixels whose signal level in subtract and store 16 is at or below this selected threshold. A matte signal of 0.0 is assigned for all pixels whose signal level is above said threshold. These 0.0's and 1.0's are a binary signal appearing as a scattering of black dots.

This binary scattering of dots is then blurred by blur function 22, in effect providing an estimate of the density of dots in the neighborhood of each pixel. This blurred image is converted to a binary image by comparing each pixel to a second threshold (23), assigning a binary matte signal level of 1.0 to all pixels whose matte signal level after blur function 22 is above the threshold, and a binary matte level of 0.0 to all other pixels. It is at this stage that the binary image represents an effective silhouette, or mask, of the subject.

After this initial effective mask is formed, it can be subjected to further adjustments, including but not limited to the following:

It can be sized, or shrunk (17). One method of shrinking involves blurring and thresholding (not to be confused with the prior blurring and thresholding).

It can be blurred again to soften its edges by blur function 18.

Image storage 9 provides one of the stored data images to inhibitor function 20, where it is multiplied by binary matte signal produced by blur function 18 to inhibit (reduce to zero) the data image signal in the silhouette area of the presenter. The inhibited data image is then routed to video projector 3.

The method described above is not restricted to infrared illumination of the pattern, but may use any non-visible wavelength band that can be sharply focused.

An infrared band in the wavelength region between 700 and 1000 nanometers is especially useful because of the wide availability of components that function in this wavelength region.

This invention provides immunity of the binary matte signal to changes of stray infrared room illumination from opening an outside door or readjusting room lighting, by differentiating the current and reference frame signals before comparing them.

Immunity to infrared reflection matches of the screen and presenter is achieved by the use of a displaced infrared pattern rather than their infrared levels.

Options

An alternate method can be used to correct for the effect of room light changes on the screen by making an offset correction in the amount of the average difference, using either a linear or a logarithmic scale, between the reference frame signal levels and the current frame signal levels in the unobscured screen area of the current image frame. Such updating may be performed every two or three frames. However, this is a more complex method of dealing with infrared spill onto the screen, as compared to the use of differentials, and the updating can cause a momentary loss of the binary matte signal.

Implementation Configurations

The method described in this invention for generating a binary matte signal can be implemented in at least four configurations, all of which will selectively inhibit a video data image.

Figure 4:
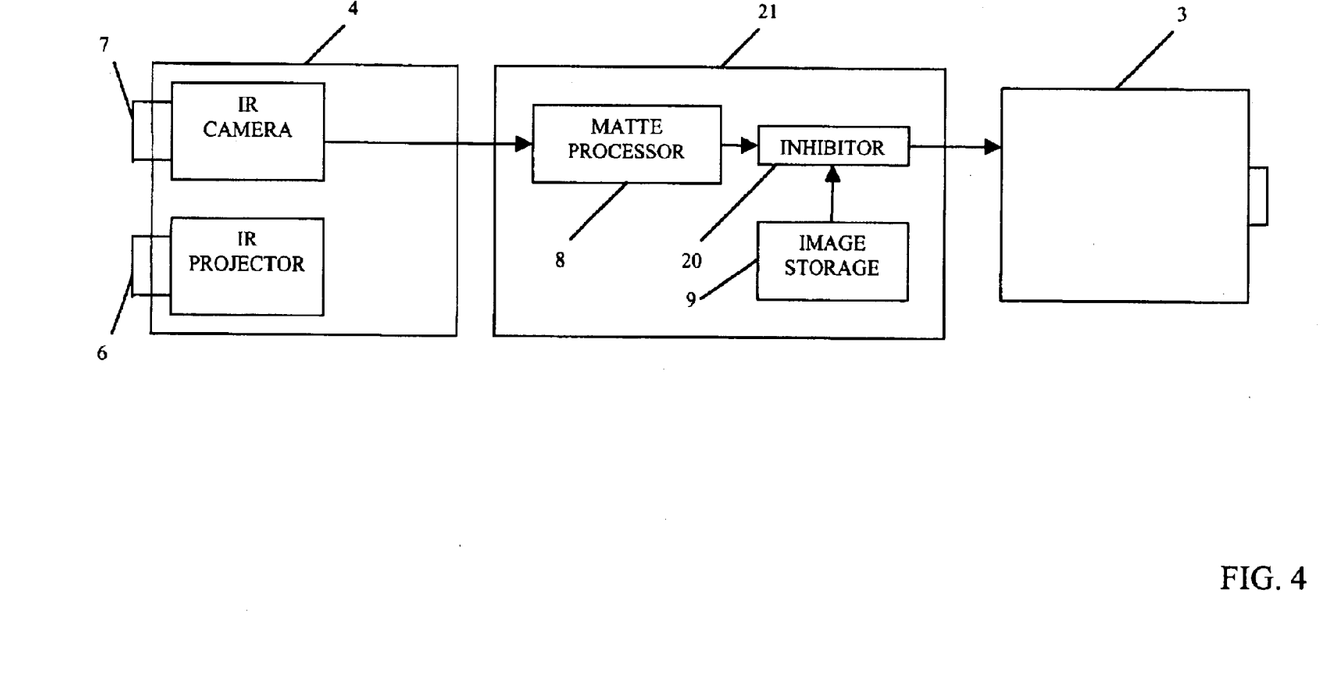
FIGS. 4, 5, 6, and 7 illustrate four physical configurations for generating and apply a matte signal to selectively inhibit a projected image.

FIG. 4 is a configuration in which computer 21 stores data images and makes all of the computations shown in dotted box 8 of FIG. 3. Housing 4 contains only the IR projector 6 projecting a pattern, and TR camera 7 providing an image of the projected pattern to processing functions 8 located within computer 21. The output of inhibit function 20 is the inhibited current image, and is routed to image projector 3. The advantage of this configuration is its simplicity and the use of a desktop computer to perform all computations.

The disadvantage of configuration 4 is the computer delay in performing the necessary computations. A delayed matte signal results in a separation of the inhibit function and the subject it is supposed to mask. A rapid movement of the presenter's arm is an example. An excessive delay permits the presenter's arm to momentarily move out from under the mask and into the projected image.

Figure 5:
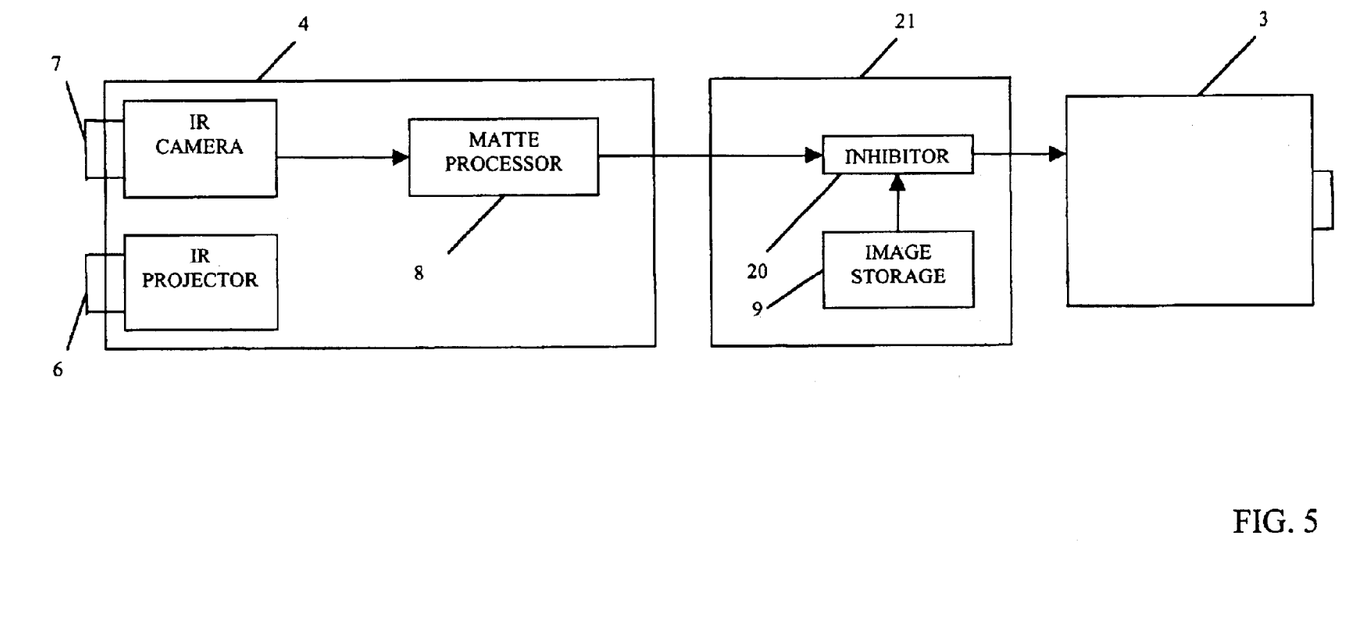

FIG. 5 shows the matte generation function 8 moved from computer 21 to IR housing 4. In this configuration, dedicated hard-wired circuits accomplish the matte generation, with a considerable reduction in delay. The matte signal 18 is then routed to inhibit function 20, located in computer 9, where it inhibits the current image selected for projection. The inhibited image is routed to image projector 3.

Figure 6:
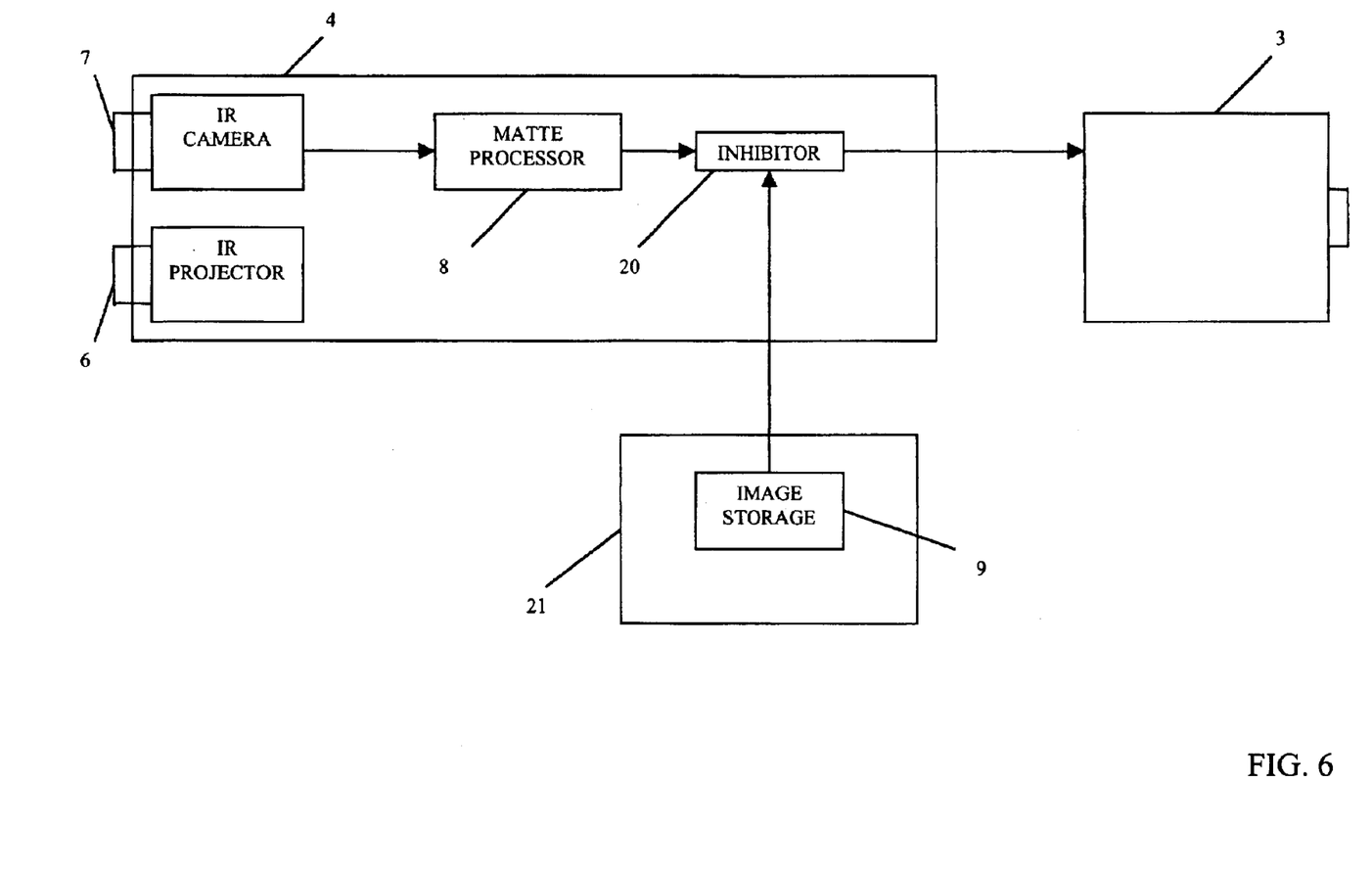

In FIG. 6 the image inhibit function 20 has been moved from computer 21 to IR housing 4, where hard-wired circuits further reduce the delay by which the inhibit signal follows the motions of the presenter. Image storage 9 is used only for the storage of the presenter's data images. There is no inhibiting penalty in a slow transfer of a stored data image in computer 21 to inhibit function 20 in housing 4.

Configuration 6, using hard-wired circuits, provides minimum time delay between a presenter's motion and the motion of the mask that covers him.

Figure 7:
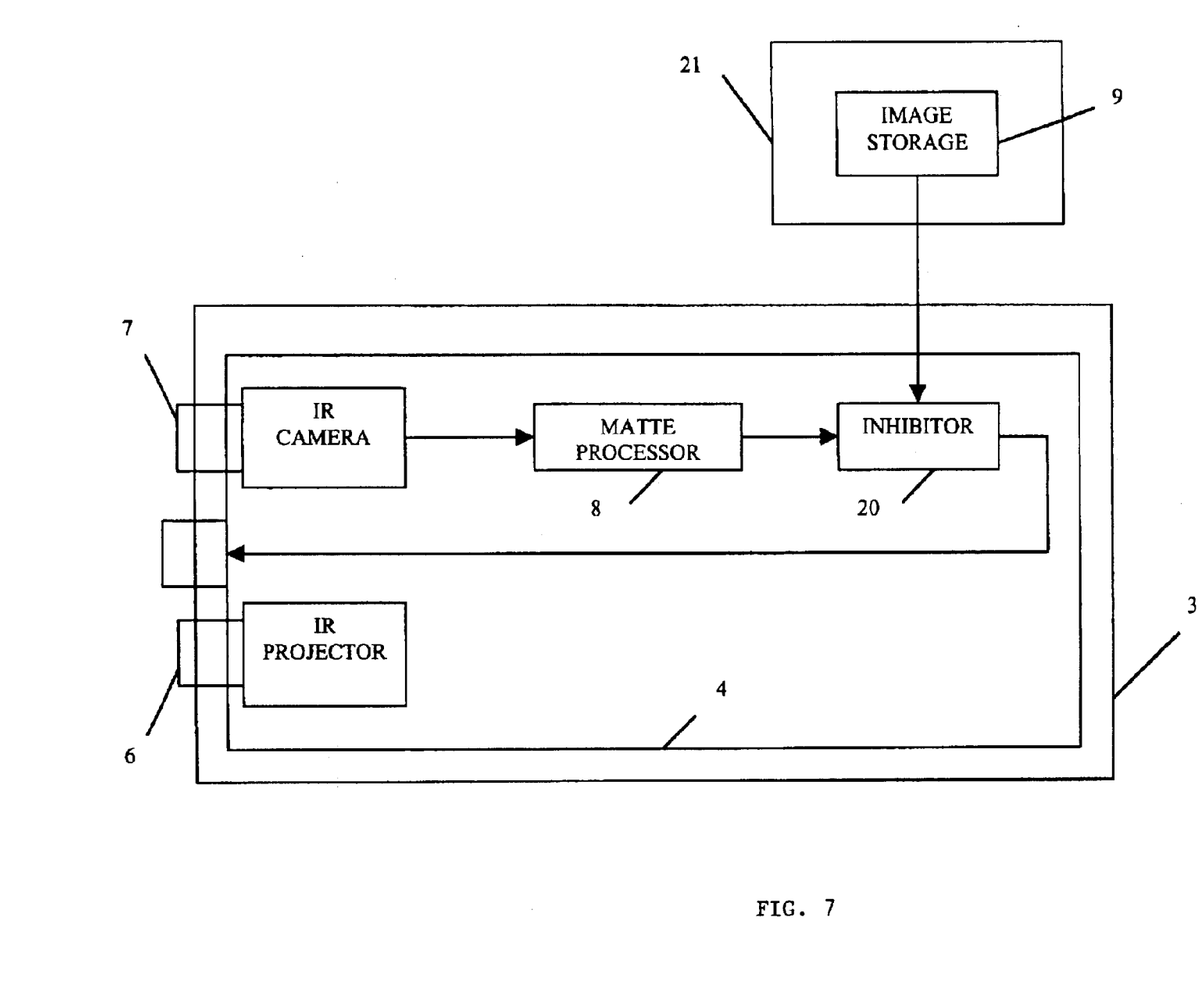

In FIG. 7 all functions in box 8 of FIG. 3 are incorporated in projector housing 3, resulting in an integrated product. Computer 21, located convenient to an operator, continues to store a presenter's data images, as shown in FIG. 7.

Implementation of the Invention

The functions of image storage (10,15,12, 13), signal differentiation (11,14), signal subtraction (16), blurring and sizing (17,18,22), greater than and less than comparison (21,23), and multiplication (20) are well known computer functions. The infrared projector 6 may be a film slide projector equipped with an incandescent lamp and incorporating a dichroic or other glass filter to reflect or absorb visible light. The infrared camera 7 may be any small video camera with dichroic or gelatin filter to reflect or absorb visible light. The video projector 3 may be any video projector receiving a video signal. The unique pattern may be a bandwidth limited random noise pattern, or a pattern simulating a bandwidth limited random noise.

The required computational functions listed above, if not performed in computer 21, are performed by programmable devices such as field programmable logic devices, or digital signal processors available from a variety of sources, the programming of which is well known to those skilled in the art.

What is claimed is:

1. A method for generating a binary matte signal that selectively inhibits data image signal levels of pixels within a silhouette area of a presenter in front of a projection screen comprising, a) projecting a pattern upon said projection screen, with said presenter absent, using an illumination having a non-visible wavelength, b) storing in a reference frame memory signal levels of said projected pattern as observed by a camera sensitive to said non-visible wavelength, c) projecting said pattern upon said projection screen, with said presenter present, using an illumination having a non-visible wavelength, d) storing in a current frame memory signal levels of said step c) projected pattern as observed by said camera, e) comparing said reference frame signal levels with said current frame signal levels at corresponding pixel addresses and storing a measure of their difference in a memory, f) identifying said presenter's silhouette area as those pixels whose neighborhoods contain at least a predetermined number of pixels whose said measure of difference between current and reference frame signal levels is above a predetermined threshold, g) assigning a matte signal first level for pixels in the identified presenter's silhouette area and a matte signal second level to all other pixels, said first level being different than said second level, thereby generating a binary matte signal.

2. The method of claim 1 in which said stored measure of the difference between said reference frame signals and said current frame signals at corresponding pixel addresses is the absolute value of the difference of their differentials.

3. The method of claim 2 in which said reference frame signals and their differentials are acquired only once prior to a presentation.

4. The method of claim 2 in which said differentials of current frame signals are determined for each succeeding current frame.

5. The method of claim 1 in which said binary matte signal is blurred.

6. The method of claim 5 in which said blurred binary matte signal is applied to a second threshold in which all signals above said second threshold are assigned a third level, and all signals below said threshold are assigned a fourth level, said third level being different than said fourth level, to form a second binary matte signal.

7. The method of claim 6 in which said second binary matte is sized to substantially conform to a size and shape of the presenter.

8. The method of claim 7 in which said second binary matte signal is blurred to soften a matte edge.

9. The method of claim 1 in which the pattern is such that a displacement of the pattern has a low probability of matching the pattern.

10. The method of claim 1 in which said pattern includes simulated random noise of limited bandwidth.

11. The method of claim 1 in which said projecting utilizes an infrared bandwidth within the region of 700 to 1000 nanometers.

12. The method of claim 1 in which illumination, employed in both projection and imaging of said pattern is limited to infrared wavelengths.

13. The method of claim 1 in which said stored measure of the difference between said reference frame signals and said current frame signals at corresponding pixel addresses is the absolute value of their arithmetic difference.

14. The method of claim 1 in which said stored reference frame signal levels are updated at selected intervals with an offset correction in the amount of an average difference between the pixels having the reference frame signal levels and the pixels having the second signal level thereby compensating for uniform changes of spill light upon the screen and presenter.

15. An apparatus for generating a binary matte signal that selectively inhibits data image signal levels of pixels within a silhouette area of a presenter in front of a projection screen comprising:

a) a projector means for projecting a pattern upon said projection screen, with said presenter absent, using an illumination having a non-visible wavelength, b) reference frame memory means for storing in a reference frame memory signal levels of said projected pattern as observed by a camera sensitive to said non-visible wavelength, c) said projector means projecting said pattern upon said projection screen, with said presenter present, using an illumination having a non-visible wavelength, d) current frame memory means for storing in a current frame memory the signal levels of said projected pattern as observed by said camera, e) means for comparing said reference frame signal levels with said current frame signal levels at corresponding pixel addresses and storing a measure of their difference in a memory, wherein said presenter's silhouette area is defined as those pixels whose neighborhoods contain at least a predetermined number of pixels whose said measure of difference between current and reference frame signal levels is above a predetermined threshold, and a matte signal first level is assigned to pixels in the presenter's silhouette area and a matte signal second level is assigned to all other pixels, said first level being different than said second level.

16. The apparatus defined by claim 15, further comprising an inhibitor coupled to said projection means and said means for comparing.

* * * * *

UNITED STATES PATENT AND TRADEMARK OFFICE
CERTIFICATE OF CORRECTION

PATENT NO. : 6,789,903 B2  
DATED : September 14, 2004  
INVENTOR(S) : Parker et al.

It is certified that error appears in the above-identified patent and that said Letters Patent is hereby corrected as shown below:

Column 1,
Lines 60, 61 and 62, please delete "and apply a matte signal" and insert -- and applying a matte signal --.

Signed and Sealed this

Seventeenth Day of May, 2005

JON W. DUDAS
*Director of the United States Patent and Trademark Office*